United States Patent [19]

Hasegawa

[11] Patent Number: 5,078,020
[45] Date of Patent: Jan. 7, 1992

[54] REVERSE SELECT SYSTEM FOR MANUAL TRANSMISSION

[75] Inventor: Hideo Hasegawa, Kawasaki, Japan

[73] Assignee: Nissan Motor Company, Ltd., Yokohama City, Japan

[21] Appl. No.: 228,202

[22] Filed: Aug. 4, 1988

[30] Foreign Application Priority Data

Aug. 6, 1987 [JP] Japan .................... 62-120842[U]

[51] Int. Cl.$^5$ .................................... F16H 5/80
[52] U.S. Cl. .................................... 74/476; 74/473 R
[58] Field of Search ................. 74/476, 473 R, 473 P

[56] References Cited

U.S. PATENT DOCUMENTS

| 3,866,488 | 2/1975 | Nakata et al. | 74/476 |
| 4,543,843 | 10/1985 | Reynolds et al. | 74/473 R |

FOREIGN PATENT DOCUMENTS

| 54-6238 | 1/1979 | Japan | 74/476 |
| 57-90446 | 6/1982 | Japan | 74/476 |
| 59-62771 | 4/1984 | Japan | 74/476 |

Primary Examiner—Leslie A. Braun
Assistant Examiner—Scott Anchell
Attorney, Agent, or Firm—Pennie & Edmonds

[57] ABSTRACT

In order to prevent inadvertent shift to reverse, a shift and select mechanism for a vehicular manual transmission is equipped with a reverse select inhibit system which includes a vehicle speed sensor, a switch circuit for producing a reverse inhibit signal when the vehicle speed is above a predetermined low speed, and an actuator assembly for receiving the reverse inhibit signal and inhibiting a select member from moving to a select position for reverse when the vehicle speed is above the predetermined low speed.

2 Claims, 2 Drawing Sheets

REVERSE SELECT SYSTEM FOR MANUAL TRANSMISSION

BACKGROUND OF THE INVENTION

The present invention relates to a reverse select system for a manual transmission of a motor vehicle such as an automobile.

Jidosha Kogaku Zensho Vol. 9 (published by Sankai Do in Nov. 1980) pages 81 and 82 shows various mechanisms for preventing driver's misoperation such as inadvertent reverse shifting during forward movement of a vehicle.

A mechanism shown in FIG. 2.88 of this document is arranged to prevent shift error to reverse by adding resistive load to the select operation to reverse with cam and spring. In another example shown in FIG. 2.89, a shift lever must be pushed down or lifted up in order to effect the reverse shift.

However, these conventional arrangements are not reliable enough, as a means for preventing misshift to reverse, especially when, in a manual transmission having a reverse select position solely for reverse the shift lever is quickly moved from a select position for lower speeds to a select position for higher speeds toward the reverse select position.

SUMMARY OF THE INVENTION

It is an object of the present invention to provide a reliable arrangement for preventing inadvertent shift to reverse.

According to the present invention, a select system of a manual transmission for a vehicle, comprises a select mechanism, vehicle speed sensing means, switch means and inhibit means. The select mechanism comprises a select member, such as a select lever, which is movable between a first select position for one or two forward speeds, and a reverse select position for reverse. The vehicle sensing means senses a vehicle speed of the vehicle, and the switch means produces an inhibit signal when the vehicle speed sensed by the vehicle sensing means is equal to or higher than a predetermined low speed, 10 km/h, for example. The inhibit means is connected with the switch means and arranged to inhibit the select member from moving into the reverse select position when the inhibit signal is present.

DETAILED DESCRIPTION OF THE INVENTION

Figure 1:
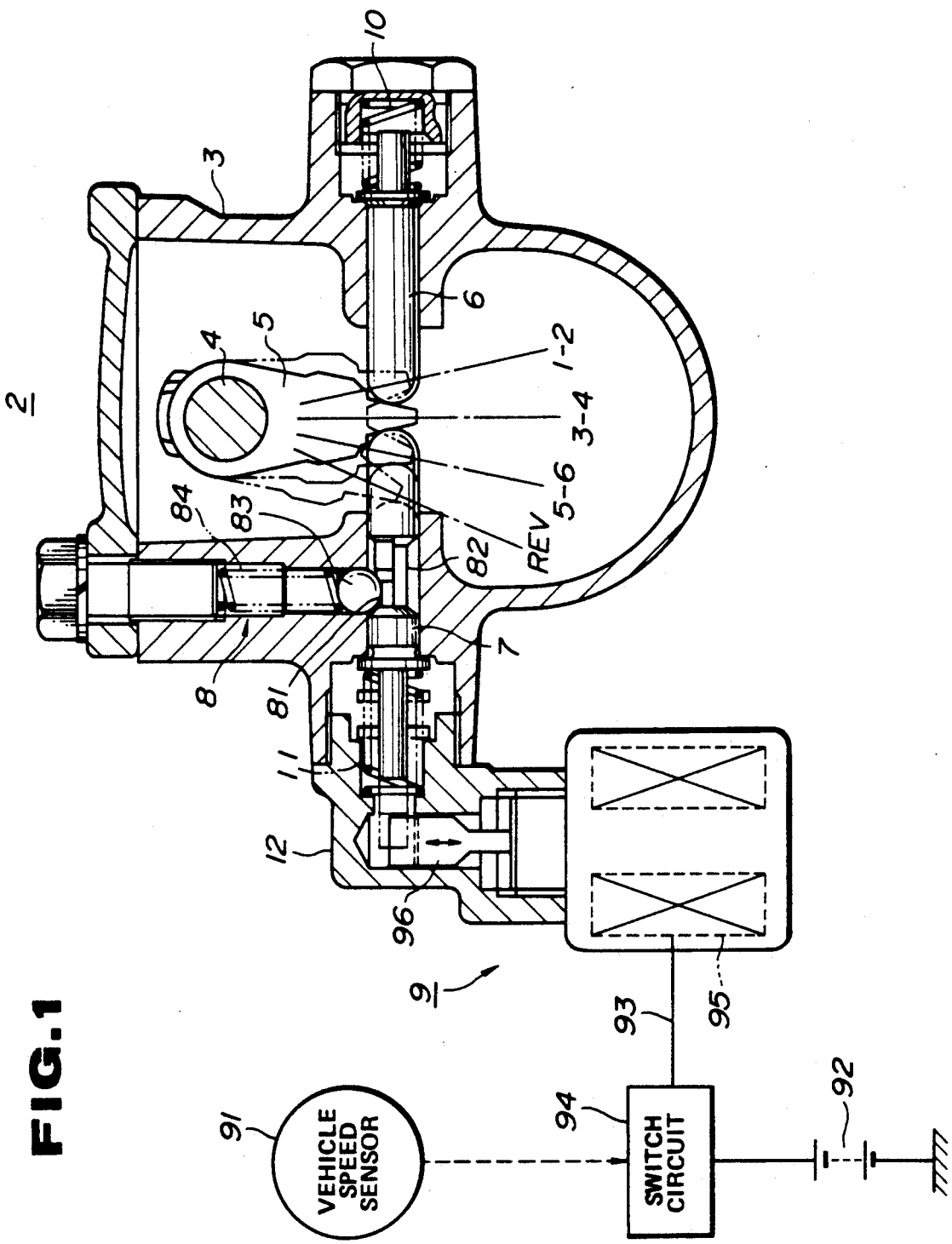
FIG. 1 is a schematic view of a select system of a manual transmission according to one embodiment of the present invention.
Figure 2:
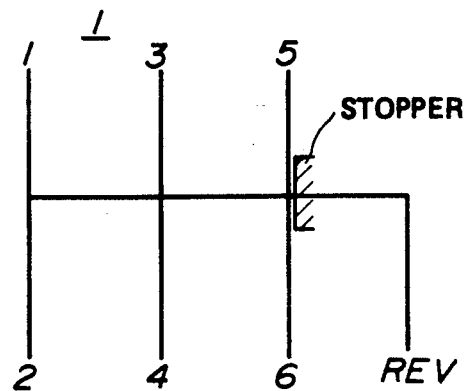
FIG. 2 is a view showing a shift pattern of the manual transmission of the embodiment.

FIGS. 1 and 2 show one embodiment of the present invention.

In this embodiment, a manual transmission of a motor vehicle has a shift pattern 1 shown in FIG. 2. The shift pattern 1 of this embodiment consists of a center line which is horizontal in FIG. 2, and four select lines which are vertical in FIG. 2. The horizontal center line corresponds to a neutral position, and the four select lines correspond, respectively, to four select positions (or select postures). The upper and lower ends of the select lines correspond to shift positions, respectively. In the first select line, which is leftmost in FIG. 2, the driver of the vehicle can obtain first or second speed by shifting a speed change lever upwardly or downwardly along the first select line, as viewed in FIG. 2. The second select line next to the first select line has one end at which a third speed can be obtained, and the other end at which a fourth speed can be obtained. Fifth and sixth speeds are obtainable in the third select line next to the second select line. The fourth select line which is rightmost in FIG. 2 extends only in one direction from a neutral position at which the fourth select line and the center line meet. The fourth select line has only a reverse shift position at which a reverse speed is obtained. The fourth select line is exclusively for the reverse speed.

As shown in FIG. 1, a select mechanism 2 of the manual transmission of this embodiment includes a transmission case 3, a shift and select shaft 4, a select lever 5, a first plunger 7, a second plunger 6, and a select check mechanism 8.

The shift and select shaft 4 is connected with the speed change lever (not shown) which can be manually moved by the driver. In this embodiment, the shift and select shaft 4 is rotated in accordance with movement of the speed change lever to select one of the four select lines. The shift and select shaft 4 is axially moved in accordance with movement of the speed change lever along the selected select line.

The select lever 5 is fixed to the shift and select shaft 4. Therefore, the select lever 5 rotates together with the shift and select shaft 4 in accordance with the select operation of the speed change lever.

The first and second plungers 7 and 6 are placed on both sides of the select lever 5, and extend toward the select lever 5 from opposite directions. The first and second plungers 7 and 6 are retained in the transmission case 3, and loaded by first and second return springs 11 and 10, respectively. Each of the first and second plungers 7 and 6 has a projecting end whose surface is spherical. The first plunger 7 is urged by the first return spring 11 toward the select lever 5, and the projecting end of the first plunger 7 normally abuts on one side of the select lever 5. The second plunger 6 is urged toward the select lever 6 by the second return spring 10, and the projecting end of the second plunger 6 normally abuts on the other side of the select lever 5. When the select lever 5 is rotated toward an angular position to select the first and second speeds, the second plunger 6 produces a select return load toward an angular position to select the third and fourth speeds. The first plunger 7 produces a select return load toward the angular position of the third and fourth speeds when the select lever 5 is rotated in a clock wise direction in FIG. 1 from the select position of the third and fourth speeds toward an angular position to select the fifth and sixth speeds or an angular position to select the reverse speed.

The select check mechanism 8 includes a check ball 83 which is normally received in a cam groove 81 (or cam groove 82) formed in the first plunger 7, and a check spring 84 for urging the check ball 83 toward the first plunger 7.

There is further provided a reverse select inhibit system 9 for inhibiting the select operation to the reverse select line which is the rightmost fourth select line shown in FIG. 2 when the forward vehicle speed is equal to or higher than a predetermined speed. The reverse select inhibit system 9 includes a vehicle speed sensor 91 for sensing a vehicle speed of the vehicle, a switch circuit 94, a solenoid coil 95 and a stopper pin 96. The switch circuit 94 is connected with the vehicle speed sensor 91. In accordance with a vehicle speed signal produced by the vehicle speed sensor 91, the switch circuit 94 energizes and deenergizes the solenoid coil 95 by switching on and off a power line 93 connecting the solenoid coil 95 with a battery 92. The stopper pin 96 is retracted when the solenoid coil 95 is deenergized, and projected when the solenoid coil 95 is energized. The stopper pin 96 is slidably received in a plug 12 which is screwed into the transmission case 3. The plug 12 has a cavity into which an inner end of the first plunger 7 moves when the select lever 5 is rotated to the reverse select angular position.

The select system of this embodiment is operated as follows:

(A) When the vehicle speed is lower than a predetermined speed:

When the vehicle is parked or driven very slowly in the forward direction, and accordingly the vehicle speed is lower than a predetermined very low speed (10 km/h, for example), then the solenoid coil 95 remains deenergized, and the stopper pin 96 is held in a retracted position shown by a broken line in FIG. 1. so that the inner end of the first plunger 7 can freely enter the cavity 6 of the plug 12. Therefore, the driver can freely move the speed change lever to the reverse select line along the center line, and to the reverse shift position along the reverse shift position.

Figure 3:
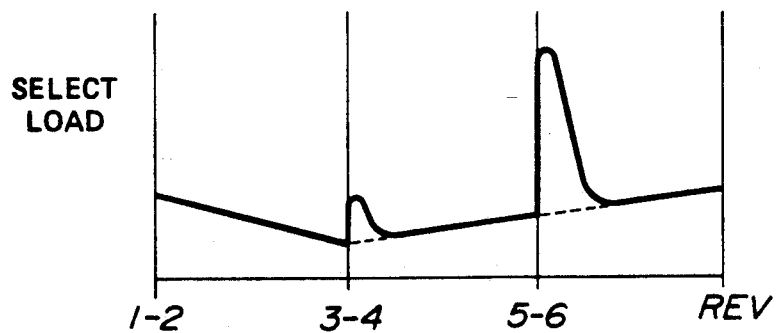
FIGS. 3 and 4 are diagrams showing characteristics of a select load in the manual transmission of the embodiment.

FIG. 3 shows a characteristic of the select load when the cam groove 81 is employed. As shown in FIG. 3, a pulse-like check force is produced at each of the select line of the third and fourth speeds, and the select line of the fifth and sixth speeds when the check ball 83 ascends a cam surface formed in the cam groove 81. On the other hand, the select load is increased gradually by the return spring 10 or 11 from the 3-4 select line to the 1-2 select line, and from the 3-4 select line to the reverse select line.

Figure 4:
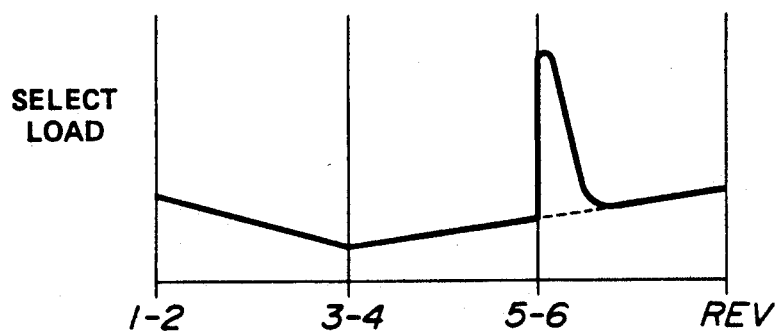

FIG. 4 shows a characteristic of the select load obtained when the cam groove 82 is employed. A pulse-like check force is formed only at the 5-6 select line when the check ball 83 ascends a cam surface formed in the cam groove 82.

(B) When the vehicle speed is equal to or higher than the predetermined speed:

When the vehicle speed is equal to or higher than predetermined speed (10 km/h, for example), the switch circuit 94 is closed by the vehicle speed signal of the vehicle speed sensor 91, and the solenoid coil 95 is energized. Therefore, the stopper pin 96 is moved from the retracted position to a projected position shown by a solid line in FIG. 1. In this projected position, the stopper pin 96 allows the select lever 5 to move to the 5-6 select angular position, but inhibits the select lever 5 from moving to the reverse select position by limiting the movement of the first plunger 7. In this way, the reverse select inhibit system 9 of this embodiment inhibits the select and shift operation to the reverse when the forward vehicle speed is not very low, so that the driver can quickly shift gears from the fourth speed to the fifth speed, or from the fourth speed to the sixth speed without fear of misshift to reverse.

The select system of this embodiment has the following advantages. (i) The select system can reliably prevent the inadvertent shift to reverse during normal driving, without affecting the desired shift to reverse when needed. (ii) The stopper pin 96 is normally retracted, and projected only when the solenoid is on, so that the reverse shift is allowed even when a fault such as disconnection of a wire is present. (iii) The select system of this embodiment does not require any complicated construction. The present invention can be easily achieved by changing the design of the plug 12 screwed into the transmission case from the outside, without changing the design of the select mechanism.

In the present invention, it is possible to employ a hydraulic or pneumatic actuating means in place of the solenoid actuator 95.

What is claimed is:

1. A select system of a manual transmission for a vehicle, comprising:

a select mechanism comprising a select member which is movable in a selecting direction between a first forward select posture and a reverse select posture when said select member is in a neutral position, and which is further movable in a shifting direction from said neutral position to a first forward gear shift position to effect a first forward gear shift and to a second forward gear shift position to effect a second forward gear shift when said select member is in said first forward select posture, and from said neutral position to a reverse shift position to effect a reverse gear shift when said select member is in said reverse select posture, and a plunger movably fitted in a through hole, extending between a transmission case interior and a transmission case exterior, so as to have movement along the longitudinal axis of said plunger, said plunger being moved by said select member when said select member moves to said reverse select posture in said selecting direction;

means for sensing a vehicle speed of the vehicle;

switch means for producing an inhibit signal when the vehicle speed sensed by said vehicle speed sensing means is equal to or greater than a predetermined speed; and an inhibit means, mounted on the transmission case exterior, for inhibiting said select member from moving into said reverse select posture by limiting movement of said plunger when said inhibit signal is present, said inhibit means comprising a stopper member and an actuator for receiving said inhibit signal and, in response to said inhibit signal, moving said stopper member between a projected position which limits movement of said plunger, thereby inhibiting said select member from moving to said reverse select posture, and a retracted position which allows axial movement of said plunger such that said select member can be moved to said reverse select posture.

2. A select system according to claim 1 wherein said inhibit means further comprises a plug which is removably mounted on said transmission case exterior, and which receives said stopper member in such a manner that said stopper member is slidable between said projected position and said retracted position, said plug having a cavity into which one end of said plunger moves when said selected member moves in said selecting direction to said reverse select posture.

* * * * *